(12) United States Patent
Bartholomä et al.

(10) Patent No.: US 6,511,099 B2
(45) Date of Patent: Jan. 28, 2003

(54) CONNECTION FITTING WITH CLAMPING COLLET FOR ELONGATED BODIES

(75) Inventors: Mario Bartholomä, Winden (DE); Fritz Zügel, Waldkirch (DE); Volker Götz, Kenzingen (DE); Philipp Gerber, Waldkirch (DE)

(73) Assignee: Anton Hummel Verwaltungs GmbH, Waldkirch (DE)

(*) Notice: Subject to any disclaimer, the term of this patent is extended or adjusted under 35 U.S.C. 154(b) by 9 days.

(21) Appl. No.: 09/901,800

(22) Filed: Jul. 10, 2001

(65) Prior Publication Data

US 2002/0006309 A1 Jan. 17, 2002

(30) Foreign Application Priority Data

Jul. 12, 2000 (DE) .......................... 100 33 911

(51) Int. Cl.$^7$ .............. F16L 5/00; H02G 3/04
(52) U.S. Cl. ............. 285/140.1; 285/322; 285/209; 285/210; 174/151; 174/65 R; 174/65 G
(58) Field of Search .................. 403/194, 261, 403/290; 285/140.1, 322, 323, 209, 210; 16/2.1; 174/151, 153 G, 152 G, 65 R, 65 G

(56) References Cited

U.S. PATENT DOCUMENTS

| 2,159,150 | A | * | 5/1939 | Heintz ................. 285/322 X |
| 5,068,496 | A | * | 11/1991 | Favalora ................ 174/65 R |
| 5,474,403 | A | * | 12/1995 | Hetrich ................. 403/369 |
| 6,179,340 | B1 | * | 1/2001 | Adolf et al. ............ 285/140.1 |
| 6,394,690 | B1 | * | 5/2002 | Bartholoma et al. ...... 403/290 |

FOREIGN PATENT DOCUMENTS

| DE | 42 25 263 | * | 2/1994 |
| DE | 43 25 420 | * | 2/1995 |
| DE | 19738517 C1 | | 11/1998 |
| EP | 0943856 A2 | | 9/1999 |
| EP | 0967701 A2 | | 12/1999 |

* cited by examiner

Primary Examiner—Robert J. Sandy
(74) Attorney, Agent, or Firm—Volpe and Koenig P.C.

(57) ABSTRACT

A connection fitting for the fastening of elongated bodies, for example of cables (2) or also hoses, tubes, corrugated hoses and the like, in an opening (3), which can be a through hole or a boring in a wall (4) of a building. The connection fitting includes a clamping collet (9) which, in its operation position, penetrates the opening (3) and is self expanding behind the opening (3), and which, by means of an axial retraction opposite to the direction of insertion, is also radially compressible and thus exerts a clamping force on the elongated body. To effect this motion of retraction, a sheath (11) is provided, which is frictionally connected or force-fit connected with a locking ring (15), which, by rotational movement of the sheath (11) itself turns accordingly and, by its own threading, is axially displaced until the ring (15) abuts the wall (4) on the opening rim (12) and remains there in a stop position. In this way, the respective thickness of the wall (4) is accommodated. A further turning of the sheath (11) using the frictional coupling with the locking ring (15) is possible, so that the clamping collet (9), following the attainment of the stop position of the locking ring (15), can being tensioning or be further tensioned because of corresponding axial dimensioning of the threading. For the user, it is principally necessary, to turn the sheath (11) in a uniform direction, in order to activate an adjustment of the connection fitting to the thickness of the wall and to firmly secure the elongated body (2) with the clamping collet.

19 Claims, 5 Drawing Sheets

CONNECTION FITTING WITH CLAMPING COLLET FOR ELONGATED BODIES

BACKGROUND

The invention relates to a connection fitting for the fastening of elongated bodies, for example cables, hoses, tubing, corrugated hose, or the like, at an opening such as a through hole or a cut-out in a wall of a building. This connection fitting includes a connection piece, which extends axially in the direction of insertion into the opening and affixes itself in the opening in its operational position. This connection piece, due to slotting which extends essentially in an axial direction, is circumferentially subdivided into holding tongues. A clamping collet protrudes, in its axial direction of insertion, within and beyond the connection piece. The clamping collet includes outwardly extending inclined members, which by a retraction back through the confining inner side of the connector which it now engages, the clamping collet is compressible radially inwardly. To engender this retraction of the clamping collet counter to the direction of insertion, a sheath is provided on its outside. Further, a stop is placed against the rim of the opening of the building wall, wherein the rim faces the direction of insertion. This stop exerts a holding force on the rim of the opening.

A connection fitting of this type has been disclosed by DE 198 28 059 A1 and has proved itself in service. This known connection fitting has the advantage of a simple mounting procedure by the insertion of the connector in the opening and the simultaneous snap-closure of the clamping collet which can flexibly expand in its cross-section. These features allow a simple screw movement on a sheath to bring about the tensioning of the clamping collet for the securement of the elongated bodies passing through the connection fitting assembly. However, the premounted positioning, in which an elongated body is not yet placed under stress, is relatively lightly secured and thus can be inadvertently released, or, in any case, be so far releasable, that later tightening up is inexact, and does not assure an optimal operational position. In such a case, then the most severe loadings cannot be transferred and in the case of a seal which must be simultaneously installed, the complete sealing integrity cannot be produced.

SUMMARY

On this account, the object of the invention is to create a connection fitting of the type described above, in which even a premounted positioning is precise and can be secured with assurance, even when the elongated bodies are not yet in a fixed position or cannot be so positioned immediately. By a tensioning of the clamping collet the best possible loading relationships are practically automatically attainable.

For the achievement of this object, the connection fitting defined in the introductory passages above is characterized, in that the connector of the connection fitting, in its operational position, possess radially, outwardly projecting, wall holding projections, and these projections are found in the direction of insertion of the connection fitting behind the opening and in that the stop is placed on a locking ring, which by its threading is displaceable against the connection fitting and its connector, and in that the sheath, which serves to tension the clamping collet by its threading, is itself placed in threaded engagement and is frictionally coupled with the locking ring in such a manner that the turning of the sheath for the said tensioning of the clamping collet also leads to the stop spatially approaching the housing wall, and in that the sheath can be additionally rotated, even if the locking ring with its stop abuts against the building wall.

A sheath for the tensioning of the clamping collet and a locking ring on the neighboring wall area of the opening are provided and the two screw movements thereof are so combined, that upon turning the sheath, the locking ring rotates along with it. The user thus needs only to fit the connection fitting into the opening and can subsequently turn the sheath to tension the clamping collet.

This action automatically leads to a situation, wherein the locking ring with the stop moves against the wall which borders the opening and firmly seats in that position. Furthermore, it is also possible, that different thicknesses of the wall at the opening zone, can be automatically compensated for. Since the locking ring is only frictionally connected with the sheath, the sheath can be further turned for final tensioning of the clamping collet, because the stop now abutting on the rim of the opening can no longer turn as before with the sheath.

Giving consideration to this situation, the sheath can nevertheless be further turned relative to the locking ring, until the clamping collet is fully radially tightened—in accordance with the thickness of the elongated body. By the friction based connection of the locking ring and the sheath, only a single screw motion is necessary to activate various functions, one being the adjustment of the connection fitting to the thickness of the wall, through the opening of which the connection fitting and connector partially penetrate, and another being the tensioning of the clamping collet in order to fix the elongated bodies in their axial direction.

With these advantages, thus a simple premounted positioning is made possible, in that first the connector element with the holding projections is inserted into an opening in a wall and set in place before the elongated body is drawn through. Thereafter, by the turning of the sheath, the stop is quickly moved into a clamping position, because the locking ring is automatically turned therewith. This is completed before the clamping collet itself—still in the same direction of rotation—is tensioned. As this is done, the elongated body, naturally is the last to be inserted in the connection fitting, before the inside diameter of the clamping collet is pressed against the outer diameter of the elongated body.

Before the final tensioning of the clamping collet, the mounting can be interrupted, if, specifically, the locking ring has reached the stop abutment. However, thereby, a reliable premounted positioning of the connection fitting on the corresponding wall can be effected.

An additional advantage of this arrangement can be seen in the fact that in a premounted positioning of this kind, the entire connection fitting is assured of freedom from being inadvertently rotated by the stop which is clampingly abutting the wall of the building.

The possibility of such a rotation would arise, if subsequent to the insertion, further turning of the sheath seizes and affixes an elongated body with the aid of the clamping collet. Conversely, in this way, a simple disassembly can be carried out.

A particularly simple and advantageous embodiment of the invention provides, that the sheath possess an open chamber located in its forward area, relative to the direction of insertion and axially neighboring its threading. This open chamber frictionally and radially encapsulates, either fully or partially, the end of the locking ring remote from the stop, or a projection of the locking ring, again remote from the stop. The sheath can then, by means of its open chamber, encapsulate the locking ring on the outside, making a frictional holding contact. If this is done, a turning of the sheath results in a corresponding rotation of the locking ring with its stop, which rotation continues, until a resistance is encountered, namely, the stop abuts on the rim of the opening.

At the same time, in the coupling zone between the sheath and the locking ring, a sealing or O-ring can be placed which will increase or produce the frictional force therebetween. The sealing ring or O-ring lies on the facing, frictionally touching surfaces of both parts, i.e. the sheath and the locking ring. It is true that a frictional closure could be brought about through a direct contacting connection of the sheath and the locking ring, however, a higher frictional bond can be achieved with such an O-ring and additionally, the function of a tight seal is achieved, so that this sealing O-ring fulfills a double function.

The open chamber of the sheath is an axial, hollow space, neighboring the inner threading of the sheath. A cylindrical hollow space serving as the open chamber can run practically concentric to the threading, can be simply fabricated, and can satisfactorily, externally encapsulate a locking ring on a matching fixture or partial part.

The threading for the locking ring which carries the stop can be shorter in its axial extent than the threading for the sheath. The stop can attain its operational position by a common rotation before the clamping collet has been tensioned. By this dimensioning of the threadings, the effect can be brought about that the locking ring assumes its stop position before the clamping collet is at least completely tensioned, so that in a desirable manner, at the start, the wall thickness compensation and the stop action against the wall about the opening can be achieved, before the elongated body is finally put in place with the help of the clamping collet. Another advantage of this differing axial dimensioning of the threadings, is that the carrying out of the already described premounted positioning can be done in satisfactory relationship to the finally installed operational positioning.

A particularly advantageous embodiment with individual parts of the connection fitting assembly reduced to the smallest possible number can be found in that the connector element, with its support and the threadings for the locking ring and for the sheath can be of one-piece construction. Further, with this arrangement, the threadings for the coaxially matched threads for the sheath and the locking ring can be made to oppose one another. The locking ring and the sheath both seize directly upon the connector element, whereby the sheath, for instance, threadedly engages a radial flange of the clamping collet with its end, and by means of its screwing motion away from the wall of the building, brings the clamping collet into the corresponding tensioned condition. Such a screw motion then leads, by means of the frictional connection with the locking ring to the situation, that this is brought in the opposite direction into its stop position. By these axial, opposite sided arrangements, and possibly by the threading lengths, the possibility arises, that the locking ring with its stop reaches its operational position before the clamping collet is fully tensioned. The user finds this a very friendly operation, since he principally has to turn the sheath in only one direction, in order to secure both the connection element at the opening and also to tension the clamping collet. In an advantageous manner, the connector element—or a sheath—which engages itself in the opening with the supports and holding projections, and extends like a casing into the forward side, as seen in the direction of insertion of a wall of the building, can be constructed in one piece. On the outside of this one-piece connector element are placed the sheath and the locking ring. At the same time, the connector element is penetrated by the clamping collet and in its operational position, also by the elongated body.

For the easiest possible operation, it is of practical value, if the threading, which is provided on the connector element for the sheath is right handed, and the threading for the stop carrying locking ring is left handed. In this way, the user can turn the sheath in the direction for assembly in which screws are normally turned when being engaged. This leads, in a desirable manner, to an opposite movement of the sheath vs. the locking ring which is rotated at the same time by frictional bonding. This allows that, by a customary screwing motion, the entire connection fitting is tightened on the wall of the building and the elongated bodies passing therethrough are clamped. As this is done, the sheath also actuates the clamping collet in which, in the known procedure of DE 198 28 059 A1, is also, in an axial direction, moved away from the wall of the building by the screw motion. However, thereby and simultaneously, the locking ring and its stop are pressed against the wall of the building, and the different wall thicknesses of the building wall can be compensated for in the adjustment of the holding projections of the connector.

Between the two oppositely threadings, a radially, projecting stop extending in an axial direction for the sheath and/or for the locking ring is provided. The sheath and the locking ring, in their premounted position, and before any preassembly activity, can both lie on this flange-like projection. By turning the sheath in one direction, both can move in common in opposite directions to one another and be moved away from the stop. This flange so acts, simultaneously, that the sheath and the locking ring, by a single turning in the opening direction do not come to abut one another, and possibly check one another. Moreover, defined starting positions are possible, from which the axial extension of the two threadings can be accordingly dimensioned, in order to immediately attain a premounted positioning, before the clamping collet is tensioned or at least is finally tensioned.

Also, the sheath, in its premount position, can lie on the top surface of the connector element. The bearing surface for the sheath would be the interior base of its open chamber for the frictional encompassing of the locking ring, or a radial shoulder therein. The chamber for the frictional connection upon its encapsulation of the locking ring can also include on its inner end, with its end face or a shoulder placed there as a counter stop surface for the fixing of the pre mount position. The inside face of the internal end rim, or an internal, circumferential shoulder can form an abutment for the fixing of the initial positioning.

An advantageous development, specifically of the embodiment with two counter directed threadings, can be found in that, the part of the sheath which encapsulates the locking ring in an axial direction, namely the open chamber thereof, is designed with such a short dimension, that after a displacement of the locking ring in its stop position, the overlapping, or the frictional area of the sheath can be released. This means, that, upon turning the sheath, the locking ring turns with it, and is brought into its stop position. With further turning, the sheath releases the locking ring, that is, the frictional connection between the sheath and the and the locking ring is ended, so that any further screw turning motion by the sheath is correspondingly eased and can now be carried out without any friction from the locking ring. In other words, the user can transfer the entire screw force previously on the locking ring to the tensioning of the clamping collet.

This action is alleviated, if the sheath is profiled on its outside and/or roughened and especially adapted to activation by hand. It is also possible that activation with the help of a tool could be provided.

For the friction driven coupling between the locking ring and the sheath, it is advantageous, if the locking ring, on its outside, includes a radial, open groove or open recess, which is enveloped by the sheath, at least in the premounting position, and if, in this groove or open recess, an O-ring is inset which will activate the friction or reinforce the sealing of the union. Thus this O-ring is secured in its axial direction and can, in spite of the axial motion upon the turning of the sheath, take the locking ring along with said sheath. At the same time, this sealing O-ring remains fixed in its axial direction, even when the encapsulating space of the sheath releases the locking ring. Possibly, even a plurality of sealing gaskets or O-rings can be installed in a correspondingly large dimensioned open recess, in order to increase the friction force by several degrees.

A different, but likewise advantageous embodiment of the invention provides that the clamping collet, the connector element and the threaded area for the locking ring all axially protrude through to the remote side of the openings, and, at least in this zone of protrusion, even has an outer thread to receive the sheath, and that the outer thread of the clamping collet for the sheath, and the outer thread of the connecting connection element for the locking ring have different diameters and are of the same direction, i.e right handed. In this case, also, a turning of the sheath activates, because of the frictional connection, a turning of the locking ring in the same rotational direction, so that also, the axial movement is in the same direction. Since, in this case, however, the threaded sheath directly engages the clamping collet, by means of an appropriate bracing of the sheath, the clamping collet can be drawn axially into its tensioned position. By a corresponding dimensioning of the length of the threadings, it can be again achieved, that the locking ring, which can threadedly engage itself with the connector element and carries the stop which contacts the opening rim, reaches its stop position, before the clamping collet is entirely, or even partially tensioned.

In the case of this embodiment, it is of value, if the axial, limiting base of the open chamber for the encapsulation of the locking ring, or abutting stop of the sheath, frictionally and connectingly contacts the stop on the end face remote from the locking ring. Since the sheath and the locking ring, because of the counter direction threading, carry out a uniform axial relative movement, an axially effective frictional surface of this kind becomes a practical matter.

Between the base of the open chamber of the sheath and the end surface of the locking ring remote from the stop, an O-ring or a sealing ring is placed for developing frictional force or for an increased degree of sealing. That means, even with this embodiment, with the aid of such a sealing ring, first the friction can be adjusted and activated and second, at the same time a sealing action is achieved.

The locking ring, which includes the stop, and serves for the compensation of the thickness of the wall of the opening, can be profiled on its outer circumferential side and/or be roughened and can be turned by hand in order to release it from its stop position. If this locking ring in its stop position is relatively rigidly attached, under certain circumstances, it is possible that the frictional force generated by the sheath does not suffice to release locking ring. If this is the case, then, in what is as a rule a rare occurrence, a demounting must be undertaken directly with a tool or especially by hand.

Profiling or roughening may be placed on that outer area of the locking ring, which is neighboring, in an axial direction, to that part of the ring encapsulated by the sheath. Thus, this part of the area remains so that from either side, access is available to the locking ring and the sheath.

The sheath can be simply a nut, which, in the case of an embodiment where the sheath clamps directly on the clamping collet, could be a cap nut, the free opening of which is dimensioned sufficiently large for the passage of elongated body which is to be secured therewith.

Very importantly, the combination of individual or of several of the above described features and measures provides a connection fitting, in which the advantages of the connection fitting in accordance with DE 198 28 059 remain fully observed, but which, however, simultaneously allow a good and solid premounting position which can be achieved by means of a single activation procedure, namely the turning of the sheath. Moreover, the continued turning of the sheath in the same rotary direction, then in a further stage of the mounting procedure, activates the affixing of the clamping collet against an elongated body which has been passed through the connection fitting, this elongated body being, especially, a cable. Also, the stop of the connection element, located opposite the outer side of the opening through a building wall, can be placed to compensate for the wall thickness by means of a screw adjustment. Also the connection fitting can be installed in openings in different thickness walls. For the retraction of the clamping collet, likewise, a screw procedure is provided. In this, the user may carry out through only a single turning motion on the sheath long enough to achieve both different functions sequentially in a logical manner. Thus, there is made available a very suitable, connection fitting which is simple in mounting and demounting.

BRIEF DESCRIPTION OF THE DRAWINGS

In the following, preferred embodiments of the invention are described in detail with the aid of the drawings. In, partially schematic presentation.

DETAILED DESCRIPTION OF THE PREFERRED EMBODIMENTS

In the following description, the different embodiments contain functionally equivalent elements which are similarly constructed and are also designated with the same reference numbers.

One of the two embodiments, generally designated 1, of the connection fitting, in accordance with FIGS. 5 to 8, is used for securing of elongated bodies, which in the preferred embodiments are cables 2, in an opening 3, which, in the disclosed embodiment is a through hole or a boring in a wall 4 of a building. The thickness of this wall 4 can be different, as is made evident in FIGS. 3, 4 and also as a comparison of the FIGS. 6, 7 will show.

Figure 3:
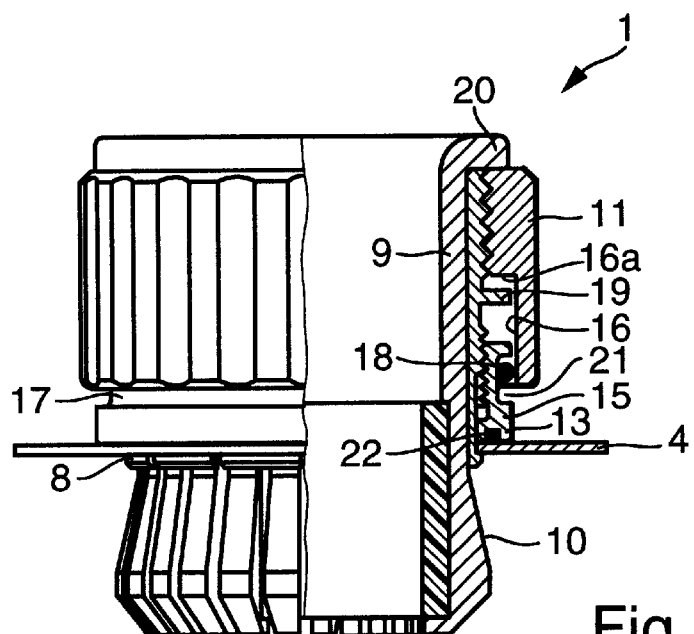
FIG. 3 is a side view, partially in cross-section, of the connection fixture in accordance with FIG. 2, after the insertion in the opening of the relatively thin wall and after a rotation of the sheath, whereby the locking ring has moved into its stop position.
Figure 4:
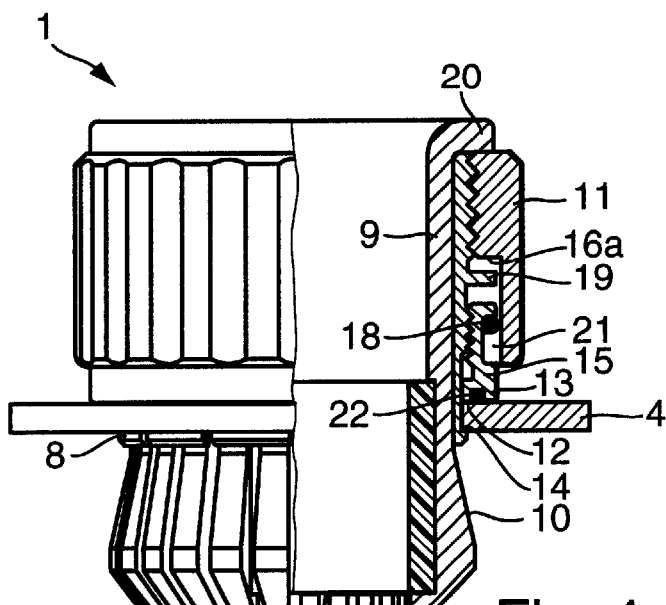
FIG. 4 is a view corresponding to FIG. 3, whereby the opening is in a relatively thick wall, so that a minimal turning of the locking ring brings these into position.
Figure 7:
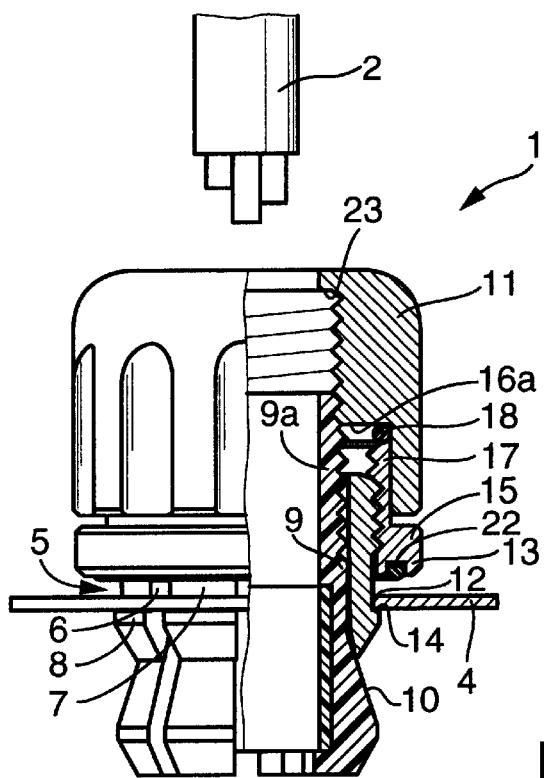
FIG. 7 is a side view, partially in cross-section of the connection fitting in accordance with FIG. 6 in the premounted state with an opening of a wall already secured position before the insertion of an elongated body, namely a cable.
Figure 8:
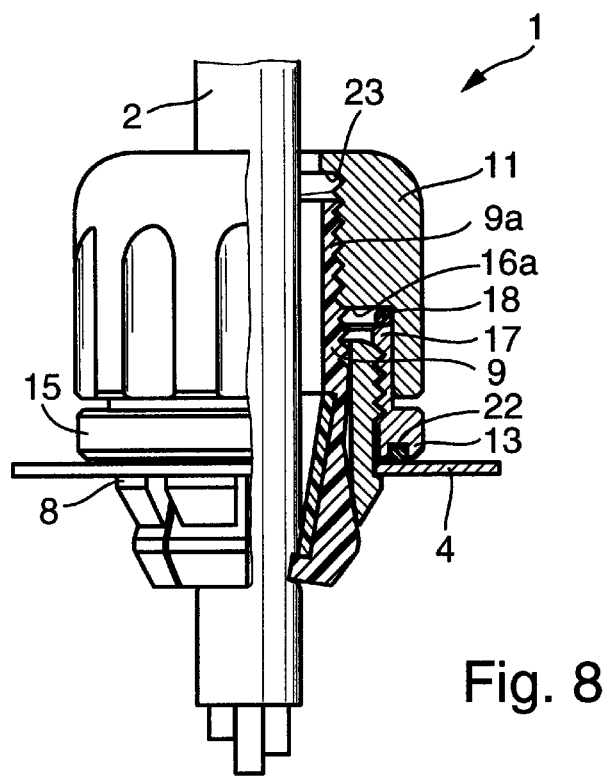
FIG. 8 is a side view, partially in cross-section, of the final mounted position of the connection fitting in accordance with FIGS. 6 and 7 after the insertion of the cable and the tensioning of the clamps by further action of the screw sheath serving as a cap screw.

The connection fitting 1 includes in both embodiments, connected in one piece with it, connectors 5 which project axially in the direction of insertion into the opening 3, when in their operative position (see FIGS. 3, 4 as well as FIGS. 7, 8). The holding connectors 5 are subdivided by axially extending running slots 6 into retaining tongues 7 which extend through the opening 3 in the direction of insertion. The tongues 7 include retaining projections 8 which snap into position in the area behind opening 3, i.e. against the rim thereof. The connectors 5, are penetrated by a clamping collet 9, which clamping collet expands itself, again in the direction of insertion, behind the connector 5 and also possesses outer, inclined surfaces 10. These inclined surfaces 10 are confined in the narrower interior of the connector 5 and upon an axial retraction, they can be compressed. In a more slender area, the clamping collet, at the same time, extends itself within the connection fitting 1 and then on through in the proximal side of the direction of insertion. Its axial length, and this is true in both embodiments, is greater than that of the connection element 1.

Figure 2:
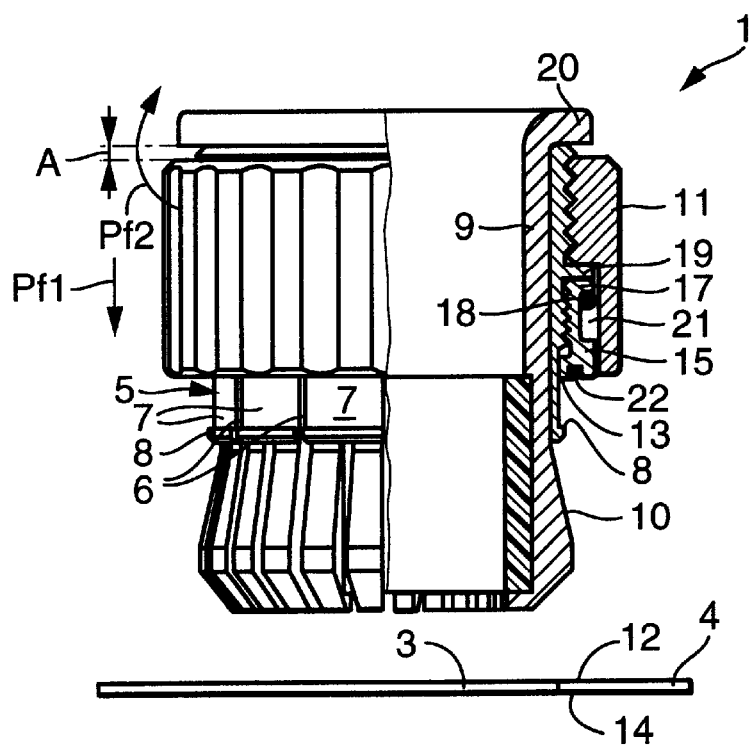
FIG. 2 is a side view, partially in cross-section, of an assembled connection fitting from the parts in FIG. 1 in their pre-mounted condition, before insertion and securement in the opening of a—rather thin—wall.

For the retraction of the clamping collet 9, opposite to the direction of insertion marked in FIG. 2 by the arrow Pf1, there is provided a sheath 11, which is placed on the outside of the clamping collet 9 and has securing capabilities yet to be described. Turning of this sheath 11 in relation to an outside threading, brings about simultaneously an axial displacement movement, which can be used for the retraction and therewith also the tensioning of the clamping collet 9.

Further, provision has been made in both disclosed embodiments, that facing the opening rim 12 proximal to the direction of insertion, i.e. the rim of the opening 3, a stop 13 has been placed, with which the entire connection fitting abuts the wall 4 when in the position of operation. This stop 13 arrangement coacts with the holding projections 8 to form between them a clamping action on the rim 12 as outlined below. In this arrangement, the holding projections 8, when in the operational position, hook from behind the rim 14 which is on the side of the opening 3 remote from the direction of insertion. When this occurs, the rims 12 and 14, i.e. the thickness of the opening 3, find themselves confined between the holding projections 8 and the stop 13.

In both embodiments, the stop 13 is located on a locking ring 15. The locking ring 15 is axially displaceable, by means of its threads, counter to the connection fitting 1 and the connector 5. The locking ring 15 is employed, in part, for the tensioning of the clamping collet 9 which is carried on a threadedly engaged sheath 11. This sheath 11 is coupled, by frictional contact or shape fit, with the locking ring 15 in such a manner, that the rotary movement of the sheath 11 leads simultaneously to a tensioning of the clamping collet 9 as well as to a rotation of the locking ring 15 and an axial approach of its stop 13 to the wall 4 of the building. Upon the turning of the sheath 11, the locking ring 15, by means of force or friction fitting, turns simultaneously. Because of the friction closure, however, the sheath 11 can yet be continued to be turned, even when the locking ring 15 and the stop 13 located thereon reach, i.e. abut, the wall 3 of the building.

It is also possible, to insert, in accordance with FIG. 2, the partially combined connection fitting into the opening 3 of the wall 4 in the direction of the arrow Pf1, whereby the slotted parts of the clamping collet 9, and the holding tongues 7 of the connector 5 can radially deflect. Thereafter, the sheath 11 can be activated (i.e. turned) which simultaneously leads to a situation that the locking ring 15 is contacted and turns with it and is brought against the wall 4 by contact of the stop 13. In doing this, a longer axial displacement is required in the case of a relatively thin wall, in accordance with FIG. 3, and a correspondingly shorter axial movement in the case of a thicker wall 4, in accord with FIG. 4, is necessary. There could be also, an automatic determination of the thickness of the wall 4, and accordingly, an adjustment to this determined thickness.

A further turning of the sheath 11 is possible, even though the locking ring 15 can no longer turn after the stop has abutted against the wall. This continued turning is possible, because of the fact that between the sheath 11 and the locking ring 15, only a frictional closure is in place. Thus, the sheath 11 can be turned beyond the noted stop point for the purpose of moving the clamping collet 9 in an axial direction and thereby bring its compression into effect, which is shown in FIGS. 5 and 8.

Figure 5:
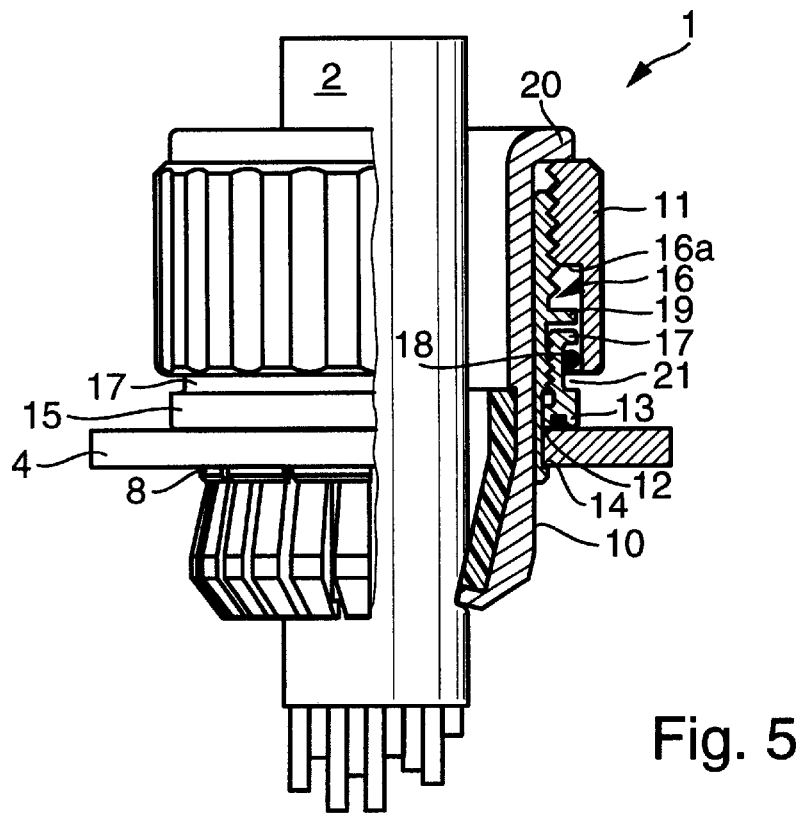
FIG. 5 is a side view, partially in cross-section, of a connection fitting after the secure insertion of an elongated body and the subsequent rotation of the sheath, whereby the catches are clampingly joined with the elongated body.

The user need only turn the sheath 11 in the same direction of rotation, in order first, to compensate for the different thickness of the wall 4, and to affix the connection fitting securely on the opening 3 of the wall 4, and second, by a further turning, to also compress the clamping collet 9, so that an elongated body inserted there in, or a cable 2, in accordance with the FIGS. 5 and 8, is firmly clamped and secured in position.

Figure 1:
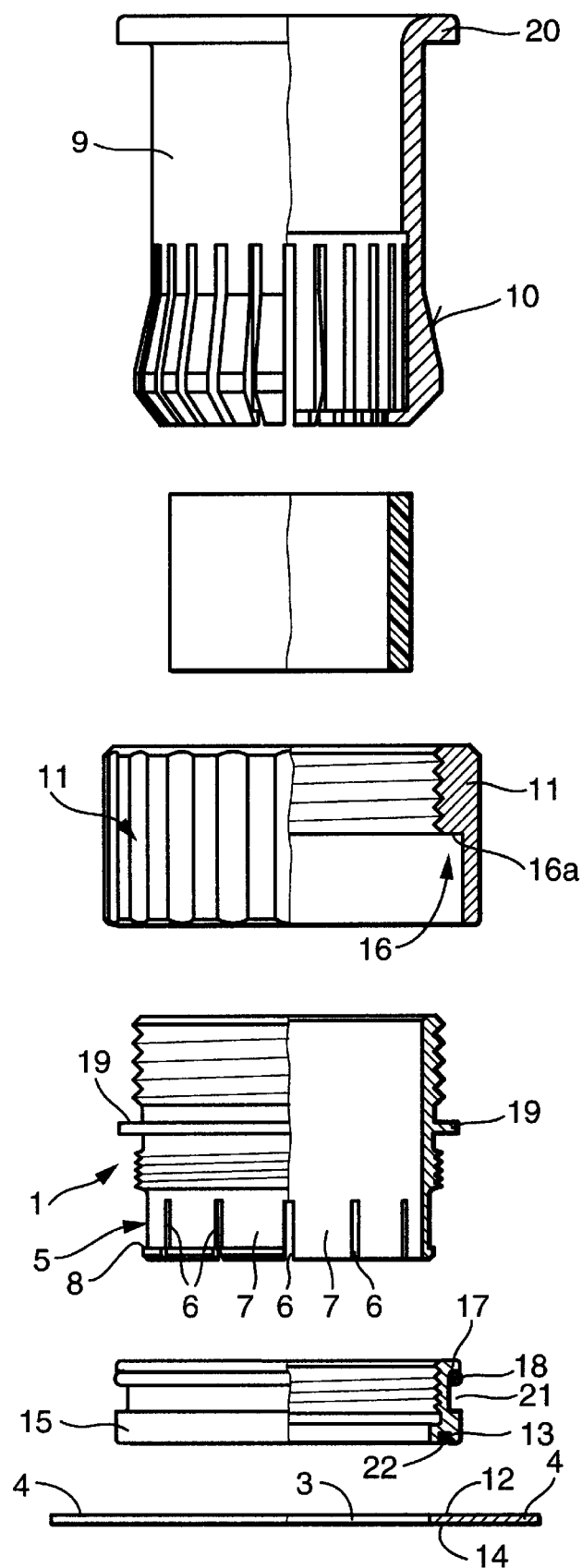
FIG. 1 is an exploded side view, partially shown in cross-section, of the individual parts of an embodiment of the connection fitting, which includes two opposed threads windings for a screw sheath and a locking ring, before their assembly and mounting.
Figure 6:
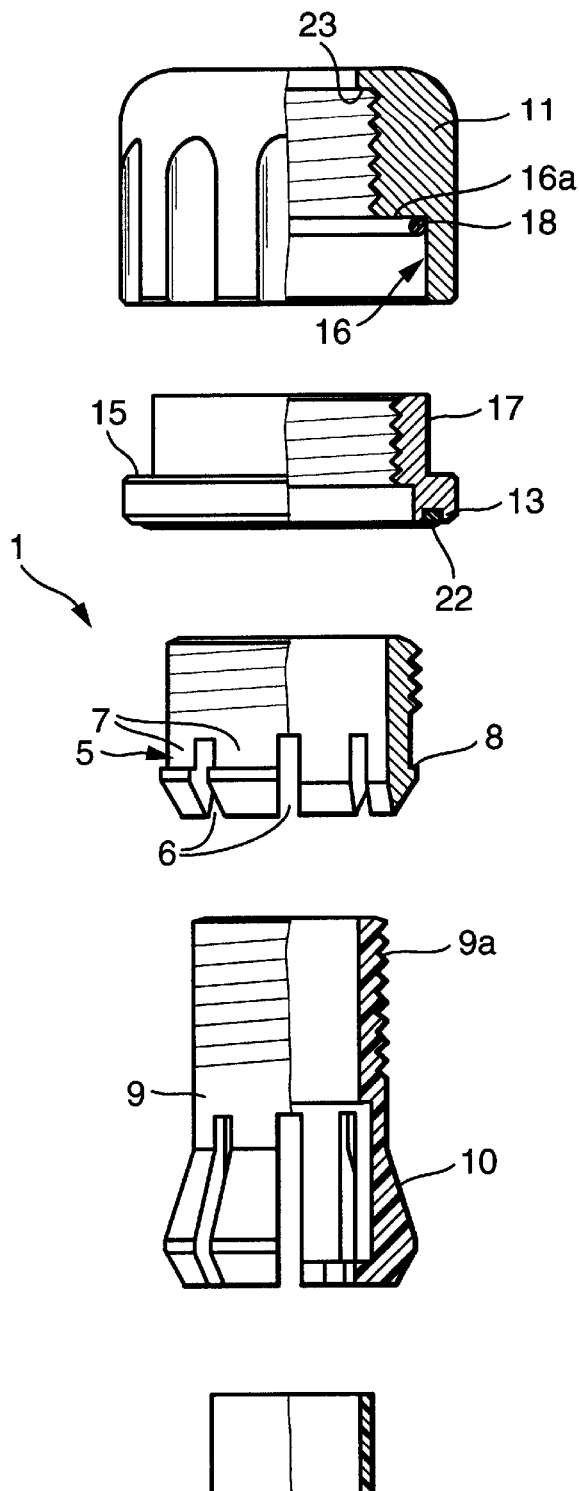
FIG. 6 is an exploded side view, partially in cross-section, of the individual parts of an alternate embodiment of the connection fitting, wherein the clamping collet includes an outside thread for coaction with a sheath and in which the threaded area of the connector element for the locking ring protrudes in the operation position.
Figure 6:
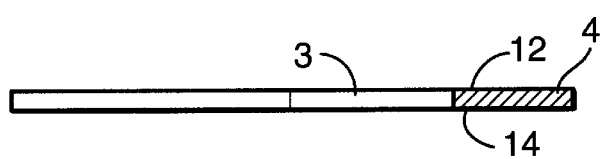

In both embodiments, the sheath 11 includes an axial open chamber 16 located in its forward part, as seen in the direction of insertion, adjacent to its inner threading (see FIGS. 1 and 6).

This chamber 16, encapsulates that part of the locking ring 15 which is distal from the stop 13, or, in other words, covers over the projection 17 of the locking ring 15 which is distal from the stop 13, this being shown especially in FIG. 2 and FIG. 7 where an early positioning of the connection fitting is presented. If the sheath 11 is turned, it also takes with it, because of this frictional contact, the locking ring 15, both in a uniform direction of rotation. This has the effect that because of the individual sense of the threading of each, an axial movement can be carried out, until the stop 13 abuts against the wall 4 and comes to a stop on the wall.

In the coupling area between the sheath 11 and the locking ring 15, in both embodiments described here, a sealing ring is placed to create or increase the frictional force. In the depicted embodiment, an O-ring 18 is shown, which in the case of the opposing, friction closure contact, lies against both elements, as can be plainly seen in the FIGS. 2 to 5 on the one hand, and in the FIGS. 7, 8 on the other. This O-ring 18 has, advantageously, a double function, in that, first, it activates the desired friction, and second, seals this zone of contact.

In this arrangement, the chamber 16 of the sheath 11 is a cylindrical hollow space, adjacent to the inner threading of the sheath 11. This chamber 16 can also encapsulate a corresponding cylindrical projection 17 on the locking ring 15.

The threading for the locking ring 15 of which the stop 13, that is, the means of vertical displacement for this locking ring 15, is, in its axial dimension, shorter than the threading or the displacement way for the sheath 11 for the tensioning of the clamping collet 9. By this shorted dimensioning, the desired effect is that the stop 13 attains its working position by means of the above described common turning, before the clamping collet 9 is fully, or partially, tensioned. By this placement on both sides, the achievement can be made, that during the first turning of the sheath 15, the clamping collet 9 is not yet fully axially retracted and tensioned. However, at this point, this tensioning movement first starts, when the stop 13 of the locking ring 15 has reached its stop position.

The two embodiments in accordance with FIGS. 1–5, in the first instance and second in accordance with FIGS. 6–8 in the second instance are, in part, differently constructed.

In the case of the embodiment shown in FIGS. 1–5, provision has been made that the connection fitting 1, the connector 5 and the two sets of threads for the locking ring 15 and for the sheath 11 are of one piece, as shown in FIG. 1. The outside sets of threads which are coaxial to one another on the connection fitting 1 run in opposite sense, one to the other. Preferentially, the threads provided for the connection fitting 1 to engage the sheath 11, which, in axial direction, is farther distanced from the connector 5, would be right handed. Conversely, the set of threads for the locking ring 15, which carries the stop 13, would advantageously be left handed. If, from the initial situation in accordance with FIG. 2, first the locking ring 15 is turned in clockwise sense (Pf2), then such a thread set combination as has been described leads to the situation where the locking ring 15 approaches the wall 4, while the sheath 11 moves away therefrom. As this is being done, the sheath 11 moves through an open spatial distance A, which will be explained in the following. This allows, that first the locking ring with the stop 13 moves into its operational position, as is shown in FIGS. 3, 4. At this point, more rotational movement is required, in order to reach the relatively thin wall 4 as is shown in FIG. 3. On the other hand, the thicker wall 4 requires fewer rotations for screw thread advancement. The possibility exists that in the case of this screw advancement, automatic adjustment to different wall thicknesses can be made available. Advantageously, because of the right hand acting threads on the sheath 11, these can be turned in the usual manner in clockwise direction, as is the case in the majority of screw and screw thread connections.

Thus, from the FIGS. 1 to 5, between the two opposite threadings, there becomes evident a radially extending, stop projection 19 which functions in an axial direction. In this case, the said stop projection 19 is a circumferential, stop ring and serves both for the sheath 11 as well as for the locking ring 15, as is made plain in FIG. 2. In the initial circumstances, in accord with FIG. 2, both the sheath 11 and the locking ring 15 contact this stop projection 19, although on opposite sides thereof. By turning the sheath 11, both parts move in common, but in different rotational directions and axially distance themselves from this stop projection 19. In accordance with this, in FIGS. 3 and 4, both said parts are seen to be separated from this stop projection 19, wherein, the distance apart in FIG. 3 is greater, because the locking ring 15 must move through a greater axial distance until it abuts the thinner wall 4. This may be seen to be the case in FIG. 4.

The sheath 11 is to be found at start of installation with its interiorly placed chamber 16 which is to encapsulate the locking ring 15, and includes a somewhat radially placed shoulder 16a which contacts the radial projecting stop 19 of the connector element 1. That indicates, that the chamber 16 encapsulates, at least in this premounted position, also the stop projection 19.

In FIG. 2, it becomes evident, that the sheath 11, which is in frictional or force fit connection with the locking ring 15, in the starting position here presented has a spatial separation A, to one of the loadable projections or connection flange 20, which is integrally in one piece with the most forward (in the direction of insertion) end of the clamping collet 9. This spatial distance disappears in the mounted positioning of FIG. 3 to 5. If the locking ring 15, subsequent to the insertion of the premounted connection fitting, as seen in FIG. 2 is rotated in the direction of the arrow Pf2 in the wall opening 3, in the sense of a tensioning and affixing, then the locking ring 15 moves itself by its threads in an axial direction counter to the direction of insertion, while the locking ring 15 is impelled in the direction of insertion to the wall 4. Until this distance A is traversed, or is dispensed with, then no retraction movement is activated for the clamping collet 9, and during this activation, the collet remains untensioned. Thus, after the adjustment of the position in accord with FIG. 3 or 4, the cable 2 can be inserted with no problem. Subsequently, by a further rotation of the sheath 11, as is shown in FIG. 5, the clamping collet 9 is tensioned, because now, the axial motion engendered by the said rotation of the sheath 11 takes the said sheath away from the wall 4 and moves the flange 20 on the clamping collet 9 with it in this direction, so that the clamping collet 9 is drawn into the connector 5, and because of the axial slotted inclined surfaces 10, the clamping collet 9 is deformed inwardly so that it now grips the cable securely.

That part of the chamber 16 which encapsulates the locking ring 15 in an axial direction, remains in this operational positioning still in two sided securement. The chamber 16 could, however, be dimensioned to be so short, that after the displacement of the of locking ring 15 into its stop position, this encapsulating or frictional zone of the locking ring 11 is released, so that the further displacement movement of the zone can be carried out without friction against the locking ring 15.

In the drawings, indication is given that the sheath 11, in both described embodiments is profiled or roughened on its outer surface, so that it can conveniently be activated by hand. This eases the manipulation of the connection fitting 1 during its mounting as well as, conversely, when it is removed.

The locking ring 15 of the embodiments in accordance with FIGS. 1 to 5, includes on its outer surface a radial groove or recess 21, which is encapsulated by the sheath 11 in the start position and during the common screw movements. In this groove or recess 21, the sealing or O-ring 18 is placed, which ring creates or reinforces the frictional force, and the ring is secured against being pressed out.

The connection fitting 1 of the embodiment in accordance with the FIGS. 6 to 8 provides, that in this case the clamping collet 9, the characteristic connection fitting 1 and the set of threads for the locking ring 15, as shown in FIGS. 7, 8, all extend axially above the remote side of the wall opening 4, and at least, in this so elevated zone, the clamping collet 9 itself includes a set of external threads for the engagement of the sheath 11. That is to say, that the sheath 11, in this case is rotatable and screwable on a set of threads on the clamping collet 9, instead of axially activating the collet 9 indirectly by a radial projecting flange 20.

Since the clamping collet 9 with its area which now includes an outer set of threads 9a and its part which has the threading for the locking ring 15, stands in relation to the connection fitting 1 in a direction counter to the insertion, this outer set of threads of the clamping collet 9 for the sheath 11 has a smaller diameter than the outer threading of the connection fitting 1 for the locking ring 15. Otherwise, both sets of threads are of the same direction and are designed to be right handed, so that the sheath 11, for the affixing of the stop 13 and for the tensioning of the clamping collet 9, can once again be turned in a clockwise direction. The axially limiting base of the chamber 16 for the encapsulation of the locking ring 15, or the shoulder 16a of the sheath 11, now touches with frictional closure the end facing remote from the stop 13 of the locking ring 15, which is clearly shown in FIGS. 7, 8. Additionally, however, the areas which extend themselves to make contact in an axial direction can touch in radial frictional closure.

Between the base or shoulder 16a of the chamber 16 of the sheath 11 and the end facing of the locking ring 15 which is remote from the stop 13, it is obvious that again the sealing ring or the O-ring 18 which create or reinforce frictional force is in place.

If the sheath 11, in accord with the embodiment of FIGS. 6 to 8 from the presented starting positioning shown in FIG. 7, is rotated in a clockwise direction, it takes along with it, in the same rotation direction, the locking ring 15 with which it is frictionally bound. This has the result, that both threaded parts approach, in the axial direction, the wall 4, until the locking ring 15, with the stop 13, which, in both embodiments likewise can contain a sealing ring 22, come to abut the wall 4. Consequently, when this occurs, the locking ring can no longer be displaced in an axial direction and cannot be turned any further. Since the locking ring 15 is thus in a stand still state for further turning, further rotation of the sheath 11 so acts that the clamping collet 9, because of its two sided thread engagement with this sheath 11, is drawn in axial direction into this sheath 11 and into the connector 5 of the connector element 1. Now, based on the outward situation of the inclined surfaces 10 and the axial slots which are found therebetween, these are now pulled together, as shown in FIG. 8. A previously inserted elongated body, for instance the cable 2, is thus clamped in a radial direction and firmly secured.

The locking ring 15, which carries the stop 13 and serves for compensating for the wall thickness at the opening 3, is constructed smooth on its outside. This outside surface, of course, could be profiled and/or roughened, so that, upon release from its stop position upon a disassembly by hand or with a tool, it can be turned, in case the friction on the stop 13 was possibly greater that the friction would be between the sheath 11 and the and locking ring 15. It should be further mentioned, that in the embodiment in accordance with FIGS. 6 to 8, the sheath 11 has become a cap screw, which upon its penetrative opening still includes a radial shoulder 23 for the clamping collet 9. With this shoulder, the collet, during its axial displacement, cannot proceed outside of the sheath 11 or the cap screw.

The connection fitting 1 serves for the fastening of elongated bodies, for instance, cable 2, or even hoses, tubes, corrugated tubes, or the like at an opening, which, for instance can be break through or a boring in a wall 4 of a building. The connection fitting 1 includes a clamping collet 9, which, when in its operative position, penetrates the opening 3. This collet 9 has the property of expanding itself. However, during a movement contrary to the direction of insertion clamping collet 9 can also collapse together and is thus clampable to the elongated body. For this retracting motion of the clamping collet 9, a sheath 11 is provided, which, by friction or force fit, is connected to a locking ring 15, and by means of the said screw motion of the sheath 11, the locking ring 15 is also turned and, by its threading, is axially displaced, until it reaches the wall 4 at the rim of the opening 3. In that location, the stop 13 of the locking ring 15 immovably abuts the rim of the said wall 4. In this way, it is possible that the respective thickness of the wall 4 can be automatically determined. A further turning of the sheath 11 is possible, because of its frictional coupling with the locking ring 15 so that the clamping collet 9, following the reaching of the stop position of the locking ring 15, can continue an already begun tensioning motion or the tensioning movement, or because of corresponding axial dimensioning of the threading, the tensioning now first begins. For the user, it is also a principal requirement, to turn the sheath 11 in the same direction, in order to achieve a fit of the connection fitting to the thickness of the wall 4, and thus to secure the elongated body 2 with the clamping collet 9.

What is claimed is:

1. A connection fitting for fastening elongated bodies, for example cables (2), hoses, tubes, corrugated piping or the like, in an opening (3), especially a through hole or a boring in a wall (4) of a building, wherein the connection fitting (1) comprises a gripping connector (5) which extends axially in a direction of insertion and in an operational position, is adapted to be inserted forward into the opening (3), the connector (5) including holding tongues formed by circumferentially arrayed axial slots (6), a self expanding, clamping collet (9) extends axially in the direction of insertion through the connector (5), which clamping collet (9) is circumferentially compressible, by a retracting axial motion and includes an inclined surface that extends through a narrower interior of the connector (5), whereby, to effect said retracting axial motion of the clamping collet (9), an exterior sheath (11) is provided, and a stop (13) which is adapted to exert a clamping action on a rim (12) of the opening (3) proximal to the direction of insertion, characterized in that the connector (5) of the connection fitting (1) at an area adapted to be positioned behind the opening (3) in the direction of insertion includes radially, projecting holding protrusions (8) which are adapted to engage behind a rim (14) of the opening (3) and in that the stop (13) is placed upon a locking ring (15) which is axially displaceable by a threaded connection to the connector (5) of the connection fitting and that the sheath (11) which is adapted to tension the clamping collet (9), is frictionally connected with the locking ring (15), so that rotational movement of the sheath (11) for tensioning the collet (9) results in a rotation of the locking ring (15) and an approach of the stop (13) to the wall (4), and that the sheath (11) is adapted to be further rotated, even when the locking ring (15) has abutted the wall (4) of the building.

2. A connection fitting in accordance with claim 1, wherein the sheath (11) at a forward area in the direction of insertion includes an axially open chamber (16) axially proximal to the threading thereon, the chamber (16) partially or completely axially encapsulates an end of the locking ring (15) which is distal from the stop (13), or a projection (17) thereof which is distal from the stop (13) in a frictional engagement.

3. A connection fitting in accordance with claim 1, wherein a sealing ring or an O-ring is placed in an area of the coupling between the sheath (11) and the locking ring (15) for producing, or reinforcing a frictional force, and the sealing ring or O-ring, upon mutual frictional contacting of surfaces of the sheath (11) and the locking ring (15), contacts both surfaces.

4. A connection fitting in accordance with claim 2, wherein the chamber (16) in the sheath (11) is a cylindrical hollow space, neighboring the set of internal threads of the sheath (11).

5. A connection fitting in accordance with claim 1, wherein the threading for the locking ring (15) which carries the stop (13) is, in the axial direction, shorter than the threading for the sheath (11) for the displacement of the clamping collet (9) and the stop (13) reaches an operational position by common rotation before the clamping collet (9) is tensioned.

6. A connection fitting in accordance claim 1, wherein the connector (5) of the connection fitting (1) is formed in one piece with the threading to engage the locking ring (15) and the threading to engage the sheath (11), and the threadings for the sheath (11) and the locking ring (15) are coaxial to one another and have opposite screw directions to one another.

7. A connection fitting in accordance with claim 6, wherein the threading provided on the connection fitting (1) to engage the sheath (11) is a right hand thread, and the threading to engage the locking ring (15) which carries the stop (13) is a left hand thread.

8. A connection fitting in accordance with claim 6, wherein a radially extending, axially acting stop projection (19) for the sheath (11) and/or for the locking ring (15) is provided between the two opposite threadings, and the sheath (11) and the locking ring (15), especially in a starting position, contact the projection (19), and by rotation of the sheath (11), both are adapted to be moved away in opposite axial directions from the projection (19).

9. A connection fitting in accordance with claim 1, wherein the sheath (11), in a starting position with a chamber (16) which encapsulates the locking ring (15) in an inwardly located end, makes contact by a generally radially placed base or shoulder (16a) thereof against a stop projection (19) of the connection fitting (1).

10. A connection fitting in accordance with claim 1, wherein the sheath (11) is connected by frictional or form fit force to the locking ring (15) in a starting position, and includes an offset distance to a projection or flange (20) on the clamping collet (9), which is to be contacted by the sheath (11).

11. A connection fitting in accordance with claim 1, wherein a part of the sheath (11) which is to axially encapsulate the locking ring (15), is dimensioned to be so short, that after a displacement of the locking ring (15), from a starting position, the encapsulating or frictional area of the sheath (11) is released.

12. A connection fitting in accordance with claim 1, wherein the sheath (11) is profiled and/or roughened on an outside thereof so that it is adapted to be activated by hand.

13. A connection fitting in accordance with claim 1, wherein the locking ring (15) includes a radially open groove or recess (21) on an outside thereof, which is encapsulated by the sheath (11) at least in a starting position and during the common screw movement, and the sealing or O-ring (18) is placed in the groove or recess (21) to produce or reinforce the frictional force.

14. A connection fitting in accordance with claim 1, wherein the clamping collet (9) is adapted to protrude farther than the connection fitting (1) and the threaded area for the locking ring (15) on a distal side of the opening (4) and includes an external threading for the reception of the sheath (11) at least in an area (9a), and the external threading of the clamping collet (9) to engage the sheath (11) and the outer threading of the connector element (1) to engage the locking ring (15), have different diameters and the same rotational direction.

15. A connection fitting in accordance with claim 1, wherein an axial limiting base or shoulder (16a) in the chamber (16) of the sheath (11), for the encapsulation of the locking ring (15), frictionally contacts the remote side face on the locking ring (15) which carries the stop (13).

16. A connection fitting in accordance with claim 15, wherein a sealing ring or an O-ring (18) is installed between the shoulder (16a) within a chamber (16) of the sheath (11) and the remote side surface of the locking ring (15) for producing or reinforcing the frictional force.

17. A connection fitting in accordance with claim 1, wherein the locking ring (15) which carries the stop (13) and is adapted to compensate for wall thickness at the opening (3), is profiled and/or roughened on an outside thereof for hand rotation from a stop position.

18. A connection fitting in accordance with claim 17, wherein profiling is placed on an exterior area of the locking ring (15) which is axially adjacent to an area encapsulated by the sheath (11).

19. A connection fitting in accordance with claim 1, wherein the sheath (11) is a nut.

* * * * *